(12) United States Patent
Schultz et al.

(10) Patent No.: US 6,517,953 B1
(45) Date of Patent: Feb. 11, 2003

(54) METAL MATRIX COMPOSITE BODY HAVING A SURFACE OF INCREASED MACHINABILITY AND DECREASED ABRASIVENESS

(75) Inventors: Brian E. Schultz, Kennett Square, PA (US); Michael K. Aghajanian, Newark, DE (US)

(73) Assignee: Lanxide Technology Company, LP, Newark, DE (US)

( * ) Notice: Subject to any disclaimer, the term of this patent is extended or adjusted under 35 U.S.C. 154(b) by 0 days.

(21) Appl. No.: 09/763,688

(22) PCT Filed: Dec. 18, 1998

(86) PCT No.: PCT/US98/26893

§ 371 (c)(1),
(2), (4) Date: Feb. 26, 2001

(87) PCT Pub. No.: WO99/32678

PCT Pub. Date: Jul. 1, 1999

Related U.S. Application Data (60) Provisional application No. 60/068,260, filed on Dec. 19, 1997.

(51) Int. Cl.⁷ .......................... B32B 15/00; B22D 25/00
(52) U.S. Cl. .................. 428/614; 164/66.1; 164/68.1; 164/69.1; 164/91; 164/94; 164/97; 164/101; 428/621; 428/627; 428/926
(58) Field of Search ................... 428/614, 621, 428/627, 926; 164/66.1, 68.1, 69.1, 91, 94, 97, 101

(56) References Cited

U.S. PATENT DOCUMENTS 4,828,008 A  *  5/1989  White et al. ............... 164/66.1
5,040,588 A  *  8/1991  Newkirk et al. ............... 164/97

FOREIGN PATENT DOCUMENTS

EP          0809050 A1  *  11/1997  .............. F16J/9/22
WO          WO-91/17275 A1  *  11/1991  .............. C22C/1/09

* cited by examiner

Primary Examiner—Robert R. Koehler
(74) Attorney, Agent, or Firm—Connolly Bove Lodge and Hutz LLP

(57) ABSTRACT

Often, metal matrix composites (MMC's) lack adequate machinability and possess excessive abrasiveness because hard ceramic materials, such as silicon carbide, are used as the reinforcement phase. To make a metal matrix composite body having a more machinable and less abrasive surface, an MMC comprising an aluminum nitride reinforcement is formed on the surface of the body. In one embodiment, a layer is provided to a permeable mass or preform at the surface at issue, the layer featuring at least a reduced loading of ceramic filler material, and sometimes no ceramic material at all. The reduced loading is achieved by incorporating a fugitive material into the coating layer. Molten matrix metal is caused to infiltrate the permeable mass or preform and the coating layer to produce a macrocomposite body comprising a metal matrix composite coating and substrate. The metal matrix composite coating layer is distinguishable from the metal matrix composite substrate material, both compositionally and in terms of resulting properties. Under spontaneous infiltration conditions, as defined herein, aluminum nitride forms in-situ in the infiltrated body, including the surface layer. The present coating technique, however, permits a thicker MMC surface layer to be produced than could be produced previously. The present MMC surface layer can be applied to virtually any reinforced or unreinforced aluminum or aluminum alloy body.

20 Claims, 2 Drawing Sheets

METAL MATRIX COMPOSITE BODY HAVING A SURFACE OF INCREASED MACHINABILITY AND DECREASED ABRASIVENESS

Cross-Reference to Related Applications

The present application is related to, and claims the benefit of, PCT/US98/126893, filed on Dec. 18, 1998, and U.S. provisional application Ser. No. 60/068,260, filed on Dec. 19, 1997.

TECHNICAL FIELD

The present invention relates to macrocomposite bodies comprising a metal or metal matrix composite substrate featuring a coating or surface layer on at least a portion thereof. In particular, the present invention relates to such surface layers or coatings whose difference in such physical properties as hardness and abrasiveness relative to the substrate increase the usefulness of the macrocomposite bodies and ease of shaping same.

BACKGROUND ART

Composite products comprising a metal matrix and a strengthening or reinforcing phase such as ceramic particulates, whiskers, fibers or the like, show great promise for a variety of applications because they combine some of the stiffness and wear resistance of the reinforcing phase with the ductility and toughness of the metal matrix. Generally, a metal matrix composite ("MMC") will show an improvement in such properties as strength, stiffness, contact wear resistance and elevated temperature strength retention relative to the matrix metal in monolithic form, but the degree to which any given property may be improved depends largely on the specific constituents, their volume or weight fraction, and how they are processed in forming the composite. In some instances, the composite also may be lighter in weight than the matrix metal per se. Aluminum matrix composites reinforced with ceramics such as silicon carbide in particulate, platelet, or whisker form, for example, are of interest because of their high stiffness, wear resistance and high temperature strength relative to aluminum.

U.S. Pat. No. 4,600,481 to Sane et al. discloses an electrolytic aluminum production cell component comprising a preformed matrix based on various ceramic materials including aluminum nitride, the preformed matrix having voids extending throughout its structure, the voids in the preformed matrix structure being filled or substantially filled with aluminum in intimate contact with the matrix usually in wetting contact whereby the matrix will remain permanently filled with molten aluminum in the conditions of use of the cell component. According to Sane et al. once the materials have been wetted by molten aluminum the wetting contact is maintained even at lower temperatures and under an atmosphere in which wetting could not initially be established. Further, by having the aluminum in wetting contact with the matrix retention of the aluminum in the structure is assisted and a protective film of aluminum forms at the surface protecting the structure from corrosion.

The metal matrix composite materials systems which presently command the greatest interest and the greatest share of the market are those having silicon carbide or aluminum oxide particulates several microns to tens of microns in size reinforcing a matrix predominantly of aluminum. Such materials systems combine good performance in terms of physical properties with relatively low cost. Such MMC's can be rather abrasive, however, which can create wear problems in those applications where the MMC component is in sliding contact with an unreinforced metal component. Even in those applications where the contact is not in sliding contact, vibrations have the potential to cause fretting wear of the contacting parts. Moreover, most components require some amount of machining. Although "exotic" forms of machining such as water jet or laser machining are available, the machining infrastructure is still based on "traditional" machining using cutting or grinding tools. Further, sometimes only traditional machining can be used to machine certain geometries or provide a particular surface finish. The problem with the above-identified popular MMC material systems is that they tend to be difficult to machine at least with traditional cutting tools. Specifically, not only can machining stock not be removed quickly, the cutting tools become dull extremely rapidly. Whether the tools can be resharpened or must be disposed of a cost is imposed in terms of down-time to change or resharpen tools.

U.S. Pat. No. 5,511,603 to Brown et al. discloses a machinable metal matrix composite material. The inventors state that small sized particles for the reinforcement phase, no greater than about three microns in diameter and preferably less than one in conjunction with relatively low particle loading, and a substantially uniform distribution of ceramic particles in a sintered preform are all important for achieving a machinable composite material. Such metal matrix composites suffer, however, from the expense of such ultra-fine powders, the relative difficulty encountered in distributing them uniformly throughout a preform and infiltrating such preforms expeditiously.

DESCRIPTION OF COMMONLY OWNED U.S. PATENTS

Commonly owned U.S. Pat. No. 4,828,008 to White et al. teaches a technique for producing a metal matrix composite body by a spontaneous infiltration process. According to the White et al. invention, a permeable mass of ceramic filler material may be infiltrated by a molten aluminum alloy containing at least 1 weight percent magnesium in the presence of a gas comprising from about 10 to 100 volume percent nitrogen without the requirement for pressure or vacuum, whether externally applied or internally created. In one embodiment of the White et al. invention, the formed metal matrix composite body is provided with an aluminum nitride skin or surface. Specifically, if the supply of molten aluminum alloy matrix metal becomes exhausted before complete infiltration of the permeable ceramic filler material, an aluminum nitride layer or zone may form on or along the outer surface of the metal matrix composite. Also, an aluminum nitride skin can be formed at the exterior surface of the permeable mass of ceramic filler material by prolonging the process conditions. In particular, once infiltration of the permeable ceramic material is substantially complete if the infiltrated ceramic material is further exposed to the nitrogenous atmosphere at substantially the same temperature at which infiltration occurred, the molten aluminum at the exposed surface will nitride. The degree of nitridation can be controlled and may be formed as either a continuous phase or discontinuous phase in the skin layer.

Commonly owned U.S. Pat. No. 5,040,588 to Newkirk et al. teaches the production of macrocomposite bodies comprising one or more metal matrix composite bodies bonded to one or more second bodies. The second body may comprise ceramic, metal or composite bodies of ceramic and metal. In a preferred embodiment of the invention, a permeable mass or preform is placed in contact with the second body. A molten matrix metal is caused to infiltrate the permeable mass or preform up to the second body, the infiltrated mass or preform thereby becoming a metal matrix composite body. Upon solidifying the matrix metal, the formed MMC remains bonded to the second body.

Commonly owned U.S. Pat. No. 5,020,584 to Aghajanian et al. teaches the addition of matrix metal in powdered form to a permeable mass to filler material or a preform. The presence of powdered matrix metal in the preform or filler material reduces the relative volume fraction of filler material to matrix metal.

DISCLOSURE OF THE INVENTION

The present invention provides a technique for producing metal matrix composite bodies having surfaces which are easier to machine and are less abrasive in use. Machinability and wear compatibility (low abrasiveness) are important considerations in producing metal matrix composite bodies. Often, metal matrix composite bodies lack these important characteristics in part because hard ceramic materials, such as silicon carbide, are used as the reinforcement phase. The present invention addresses these problems by providing a surface layer on the MMC material which has the desired characteristics. Specifically, the surface layer is itself a MMC material comprising aluminum nitride.

To make such a metal matrix composite body, for example, a layer is provided to a permeable mass or preform at the surface or surfaces where a reduced volumetric loading of ceramic filler material relative to the permeable mass or preform is desired. The reduced loading may be achieved by incorporating a fugitive material into the layer. In a preferred embodiment, the fugitive material comprises a fugitive metal. In this embodiment, the presence of ceramic filler material in the layer is optional. The layer as applied is permeable and may be applied using most preforming techniques. A particularly preferred technique for applying the permeable coating layer is to prepare a slurry comprising the coating materials. and apply the slurry by processes such as painting, spraying, dip coating, stuccoing, etc.

Molten matrix metal is caused to infiltrate the permeable mass or preform and the coating layer to produce a macrocomposite body comprising a metal matrix composite substrate defined by the infiltrated permeable mass or preform and a metal matrix composite surface layer metallurgically bonded to the substrate. The metal matrix composite surface layer is machinable and distinguishable from the metal matrix composite substrate material. When the infiltration process is a spontaneous infiltration featuring a matrix metal comprising aluminum and an infiltrating atmosphere or an infiltration enhancer comprising nitrogen, aluminum nitride forms as a by-product, both in the substrate and in the coating layer. Because of this in-situ formed aluminum nitride, it is possible to apply a permeable coating which prior to infiltration contains no ceramic reinforcement (e.g., filler) materials. and end up with a MMC material containing ceramic material after matrix metal infiltration, the in-situ formed aluminum nitride being the ceramic reinforcement.

The present "fugitive material coating technique" permits a thicker machinable layer to be produced than could otherwise be produced by permitting molten aluminum to "over-infiltrate" a permeable mass or preform to form an aluminum nitride-bearing "skin" on the surface of the formed composite. The thickness of the surface layer may become an issue because if the layer is to be machined, adequate machining stock must be provided.

Even when the surface layer contains no ceramic filler material added to the permeable surface coating composition, the as-infiltrated surface layer is a metal matrix composite material when in-situ formed aluminum nitride is present. Particularly when the as-infiltrated surface layer consists essentially of aluminum alloy and aluminum nitride, such surface layer is likely to be substantially more machinable and less abrasive than the metal matrix composite substrate to which it is attached.

The techniques of the present invention may be used to produce an MMC surface layer on an already-formed MMC substrate body. Specifically, a MMC substrate may be coated on one or more surfaces with the permeable coating layer comprising at least one fugitive material. If the MMC substrate body was not produced by a spontaneous infiltration process, and if it is desired that the MMC coating layer be formed by spontaneous infiltration. it may be necessary to provide an infiltration enhancer or infiltration enhancer precursor to the system at some point during processing. The matrix metal which infiltrates the coating layer could be supplied by the MMC substrate body, or from a different source.

Likewise, the above technique may be applied to substrates of unreinforced metals to yield MMC coated metals in which the MMC surface coating is wear compatible and machinable.

Definitions

"Aluminum", as used herein, means and includes essentially pure metal (e.g., a relatively pure, commercially available unalloyed aluminum) or other grades of metal and metal alloys such as the commercially available metals having impurities and/or alloying constituents such as iron, silicon, copper, magnesium, manganese, chromium, zinc, etc., therein. An aluminum alloy for purposes of this definition is an alloy or intermetallic compound in which aluminum is the major constituent.

"Balance Non-Oxidizing Gas", as used herein, means that any gas present in addition to the primary gas comprising the infiltrating atmosphere, is either an inert gas or a reducing gas which is substantially non-reactive with the matrix metal under the process conditions. Any oxidizing gas which may be present as an impurity in the gas(es) used should be insufficient to oxidize the matrix metal to any substantial extent under the process conditions.

"Barrier" or "barrier means", as used herein, means any suitable means which interferes, inhibits, prevents or terminates the migration, movement, or the like, of molten matrix metal beyond a surface boundary of a permeable mass of filler material or preform, where such surface boundary is defined by said barrier means. Suitable barrier means may be any such material, compound, element, composition, or the like, which, under the process conditions, maintains some integrity and is not substantially volatile (i.e., the barrier material does not volatilize to such an extent that it is rendered non-functional as a barrier).

Further, suitable "barrier means" includes materials which are substantially non-wettable by the migrating molten matrix metal under the process conditions employed. A barrier of this type appears to exhibit substantially little or no affinity for the molten matrix metal, and movement beyond the defined surface boundary of the mass of filler material or preform is prevented or inhibited by the barrier means. The barrier reduces any final machining or grinding that may be required and defines at least a portion of the surface of the resulting metal matrix composite product. The barrier may in certain cases be permeable or porous, or rendered permeable by, for example, drilling holes or puncturing the barrier, to permit gas to contact the molten matrix metal.

"Carcass" or "Carcass of Matrix Metal", as used herein, refers to any of the original body of matrix metal remaining which has not been consumed during formation of the metal matrix composite body, and typically, if allowed to cool, remains in at least partial contact with the metal matrix composite body which has been formed. It should be understood that the carcass may also include a second or foreign metal therein.

"Filler", as used herein, is intended to include either single constituents or mixtures of constituents which are substantially non-reactive with and/or of limited solubility in the matrix metal and may be single or multi-phase. Fillers may be provided in a wide variety of forms. such as powders, flakes, platelets, microspheres, whiskers, bubbles, etc., and may be either dense or porous. "Filler" may also include ceramic fillers, such as alumina or silicon carbide as fibers, chopped fibers, particulates, whiskers, bubbles, spheres, fiber mats, or the like, and ceramic-coated fillers such as carbon fibers coated with alumina or silicon carbide to protect the carbon from attack, for example, by a molten aluminum parent metal. Fillers may also include metals.

"Fugitive Material", as used herein. means a material which permits and results in a reduced volumetric loading of ceramic filler material in the MMC surface layer by displacing such filler material in the permeable surface coating.

"Fugitive Metal", as used herein, means a fugitive material which possesses at least one property characteristic of metals and which is capable of reaction with or substantial dissolution of or into the matrix metal. Fugitive metals include for example, the semimetals silicon, germanium, boron, and arsenic but exclude carbon.

"Infiltration", as used herein, means the bulk transport of matrix metal into a permeable mass or permeable surface layer, with or without pressure or vacuum assist.

"Infiltrating Atmosphere", as used herein, means that atmosphere which is present which interacts with the matrix metal and/or preform (or filler material) and/or infiltration enhancer precursor and/or infiltration enhancer and permits or enhances spontaneous infiltration of the matrix metal to occur.

"Infiltration Enhancer", as used herein, means a material which promotes or assists in the spontaneous infiltration of a matrix metal into a filler material or preform. An infiltration enhancer may be formed from. for example, a reaction of an infiltration enhancer precursor with an infiltrating atmosphere to form (1) a gaseous species and/or (2) a reaction product of the infiltration enhancer precursor and the infiltrating atmosphere and/or (3) a reaction product of the infiltration enhancer precursor and the filler material or preform. Moreover, the infiltration enhancer may be supplied directly to at least one of the preform, and/or matrix metal, and/or infiltrating atmosphere and function in a substantially similar manner to an infiltration enhancer which has formed as a reaction between an infiltration enhancer precursor and another species. Ultimately, at least during the spontaneous infiltration, the infiltration enhancer should be located in at least a portion of the filler material or preform to achieve spontaneous infiltration.

"Infiltration Enhancer Precursor" or "Precursor to the Infiltration Enhancer", as used herein, means a material which when used in combination with the matrix metal, preform and/or infiltrating atmosphere forms an infiltration enhancer which induces or assists the matrix metal to spontaneously infiltrate the filler material or preform. Without wishing to be bound by any particular theory or explanation, it appears as though it may be necessary for the precursor to the infiltration enhancer to be capable of being positioned, located or transportable to a location which permits the infiltration enhancer precursor to interact with the infiltrating atmosphere and/or the preform or filler material and/or metal. For example, in some matrix metal/infiltration enhancer precursor/infiltrating atmosphere systems, it is desirable for the infiltration enhancer precursor to volatilize at, near, or in some cases, even somewhat above the temperature at which the matrix metal becomes molten. Such volatilization may lead to: (1) a reaction of the infiltration enhancer precursor with the infiltrating atmosphere to form a gaseous species which enhances wetting of the filler material or preform by the matrix metal; and/or (2) a reaction of the infiltration enhancer precursor with the infiltrating atmosphere to form a solid, liquid or gaseous infiltration enhancer in at least a portion of the filler material or preform which enhances wetting; and/or (3) a reaction of the infiltration enhancer precursor within the filler material or preform which forms a solid, liquid or gaseous infiltration enhancer in at least a portion of the filler material or preform which enhances wetting.

"Matrix Metal" or "Matrix Metal Alloy", as used herein, means that metal which is utilized to form a metal matrix composite (e.g., before infiltration) and/or that metal which is intermingled with a filler material to form a metal matrix composite body (e.g., after infiltration). When a specified metal is mentioned as the matrix metal, it should be understood that such matrix metal includes that metal as an essentially pure metal, a commercially available metal having impurities and/or alloying constituents therein, an intermetallic compound or an alloy in which that metal is the major or predominant constituent.

"Matrix Metal/Infiltration Enhancer Precursor/Infiltrating Atmosphere System" or "Spontaneous System", as used herein, refers to that combination of materials which exhibit spontaneous infiltration into a preform or filler material. It should be understood that whenever a "/" appears between an exemplary matrix metal, infiltration enhancer precursor and infiltrating atmosphere that the "/" is used to designate a system or combination of materials which, when combined in a particular manner, exhibits spontaneous infiltration into a preform or filler material.

"Metal Matrix Composite" or "MMC", as used herein, means a material comprising a two- or three-dimensionally interconnected alloy or matrix metal which has embedded a preform or filler material. The matrix metal may include various alloying elements to provide specifically desired mechanical and physical properties in the resulting composite.

A Metal "Different" from the Matrix Metal means a metal which does not contain, as a primary constituent, the same metal as the matrix metal (e.g., if the primary constituent of the matrix metal is aluminum, the "different" metal could have a primary constituent of, for example nickel).

"Permeable Surface Layer" or "Permeable Coating," as used herein. means a porous mass featuring at least one fugitive material which is applied to one or more surfaces of a body with the intent or objective that such mass will be infiltrated with molten metal to form an MMC surface layer. If a filler material is not present in the permeable surface layer, at least one filler material must be formed in situ during infiltration.

"Preform" or "Permeable Preform", as used herein, means a porous mass of filler or filler material which is manufactured with at least one surface boundary which essentially defines a boundary for infiltrating matrix metal, such mass retaining sufficient shape integrity and green strength to provide dimensional fidelity prior to being infiltrated by the matrix metal. The mass should be sufficiently porous to accommodate spontaneous infiltration of the matrix metal thereinto. A preform typically comprises a bonded array or arrangement of filler, either homogeneous or heterogeneous. and may be comprised of any suitable material (e.g., ceramic and/or metal particulates, powders, fibers, whiskers, etc., and any combination thereof). A preform may exist either singularly or as an assemblage.

"Reservoir", as used herein, means a separate body of matrix metal positioned relative to a mass of filler or a preform so that, when the metal is molten, it may flow to replenish, or in some cases to initially provide and subsequently replenish, that portion, segment or source of matrix metal which is in contact with the filler or preform.

"Spontaneous Infiltration", as used herein, means the infiltration of matrix metal into the permeable mass of filler or preform occurs without requirement for the application of pressure or vacuum (whether externally applied or internally created).

"Substrate" or "MMC Substrate", as used herein, means the body to which the surface layer is applied, and which defines the basic size and shape of the desired article.

"Surface Layer" or "MMC Surface Layer", as used herein, means the MMC material deposited or formed on at least a portion of at least one surface of the substrate and having reduced abrasiveness and/or enhanced machinability with respect to an MMC substrate.

MODES FOR CARRYING OUT THE INVENTION

The present invention relates to forming a metal matrix composite body by spontaneously infiltrating a filler material or preform with molten matrix metal. Particularly, an infiltration enhancer and/or an infiltration enhancer precursor and/or an infiltrating atmosphere are in communication with the filler material or preform, at least at some point during the process, which permits molten matrix metal to spontaneously infiltrate the filler material or preform.

The present invention addresses and solves many of the above-identified difficulties with making and using metal matrix composite materials, particularly when such materials are fabricated into specific end-use components. Machinability of MMC materials is of considerable importance, particularly for components requiring machining of large surfaces, such as brake rotors and clutch plates.

Specifically, it has been discovered that a metal matrix composite material whose reinforcement phase consists predominantly or essentially of aluminum nitride possesses both improved machinability and reduced abrasiveness in comparison to MMC's featuring aluminum oxide or silicon carbide as the reinforcement phase. The machinability of a material is dependent upon many variables. In general however, one can say that the machinability of metal matrix composite materials decreases as the amount and hardness of the reinforcement phase of the MMC increases. It has been discovered that a metal matrix composite material whose ceramic reinforcement phase consists essentially of aluminum nitride is relatively machinable. By "relatively machinable" what is meant is that such material may be machined using non-diamond or non-diamond-coated cutting tools and the cutting tool can still possess a reasonable lifetime before it must be resharpened or discarded. Without wishing to be bound by any particular theory or explanation, it may be that the "relative softness" of aluminum nitride enhances machinability. Although still quite hard compared to most metals, aluminum nitride is not as hard as many ceramic materials, particularly those ceramic materials which are popular as reinforcements for metal matrix composites, such as silicon carbide and aluminum oxide.

In addition to friction components, another broad potential application area for such MMC's bearing an aluminum nitride rich surface layer is in the field of contact wear. In the absence of such a layer, it has been observed that an MMC component featuring, for example, a silicon carbide reinforcement tends to cause accelerated wear to an adjoining component. Such wear can be pronounced when two components are sliding past one another in the absence of a lubricant such as oil to provide an oil film (e.g., a hydrodynamic layer) which would otherwise keep the components physically separated from one another. Thus, an MMC body featuring the present aluminum nitride containing surface layer may find additional applications in machines which call for unlubricated sliding contact of their various components.

Like the MMC substrate to which it is bonded, the MMC surface layer is highly engineerable. First the composition of the MMC surface layer may be varied widely. The metal matrix composite surface layer typically comprises aluminum nitride embedded in a matrix metal. The aluminum nitride phase may be continuous or discontinuous. The matrix metal embedding the aluminum nitride may have substantially the same chemical composition as the matrix metal in the underlying metal matrix composite substrate, or it may have a substantially different chemical composition. Further, the metal matrix composite surface layer may feature one or more reinforcement phases in addition to aluminum nitride. This optional reinforcement phase may be the same material as the reinforcement phase making up the underlying metal matrix composite substrate, or it may be an entirely different material, or it may be the same material chemically but feature a morphology different from that of the reinforcement phase of the substrate MMC. For example, if the reinforcement phase in the substrate comprised alumina particulates, in the MMC surface layer it might comprise platelets. The optional reinforcement phase (s) in the surface layer may be present in concentrations (loadings) up to about 70 volume percent.

It may be important to engineer the composition of the MMC surface layer such that its coefficient of thermal expansion is similar to or equal to that of the underlying MMC substrate. It is a basic tenet of material science that two articles joined to one another having different thermal expansion coefficients create stresses on each other as the temperature to which they are exposed changes. These stresses can become sufficient to cause physical deformation of the articles or even cracking of one or both articles. In the present as-infiltrated MMC surface coatings, the thermal expansion coefficient can be engineered in a number of ways—by tailoring the amount of aluminum nitride present, by tailoring the amount and kind of any filler material which might be added, and by tailoring the composition of the matrix metal, for example.

An MMC surface layer featuring aluminum nitride dispersed in a metallic matrix also features relatively high thermal conductivity, a property which can be used to advantage in friction components. High thermal conductivity is frequently desirable, especially for friction components. The heat generated by friction is thereby capable of being rapidly dissipated away from its point of origin. Although the matrix metal in the surface layer typically already possesses high thermal conductivity, the high thermal conductivity of aluminum nitride may become important when the matrix of the surface layer comprises a not-so-thermally conductive metal such as iron.

A number of techniques may be employed to produce a metal matrix composite surface layer containing aluminum nitride. In perhaps the simplest embodiment aluminum nitride particulate is placed or coated onto a permeable mass (or preform) or onto a formed metal matrix composite body and subsequently infiltrated with a molten matrix metal. In the case of coating aluminum nitride onto a permeable mass or preform, it is possible that a single infiltration of molten matrix metal through the permeable mass and aluminum nitride coating is all that is required. In the case of coating aluminum nitride particulate onto an already formed metal matrix composite body, the matrix metal for the coating layer may be supplied from the source of matrix metal within the formed metal matrix composite body, or it may be supplied from an external source.

In a preferred embodiment, the aluminum nitride phase within the surface layer is formed in situ during a spontaneous infiltration process. As a brief overview of the concept of spontaneous infiltration, a body of molten matrix metal may be caused to infiltrate a permeable mass of one or more filler materials (e.g., ceramic particulates) without the requirement for the application of pressure or vacuum when the body of molten matrix metal contacts the permeable mass, for example, in the presence of an infiltration enhancer, or an infiltration to enhancer precursor/infiltrating atmosphere combination. A particularly preferred embodiment of spontaneous infiltration features a matrix metal comprising aluminum, an infiltration enhancer precursor comprising magnesium, and an infiltrating atmosphere comprising nitrogen. In this particularly preferred embodiment aluminum nitride is formed in-situ in the developing metal matrix composite body as a by-product of the process. This in-situ formed aluminum nitride manifests itself in at least two forms: first, as discrete discontinuous bodies contacted substantially only by matrix metal; and second, as a layer covering at least a portion of the filler material bodies making up the permeable mass. Generally speaking, the higher the processing temperature, the greater the amount of in situ aluminum nitride produced.

Although the above discussion occurs largely in the context of the aluminum/magnesium/nitrogen spontaneous infiltration system, it should be understood that the concept contained herein should be applicable to other spontaneous infiltration systems. Among those that have been identified to date which are applicable to the present invention include the aluminum/strontium/nitrogen system and the aluminum/calcium/nitrogen system.

The following is a broader, more generalized discussion of the phenomenon of spontaneous infiltration.

In order to effect spontaneous infiltration of the matrix metal into the filler material or preform, an infiltration enhancer should be provided to the spontaneous system. An infiltration enhancer could be formed from an infiltration enhancer precursor which could be provided (1) in the matrix metal; and/or (2) in the filler material or preform; and/or (3) from the infiltrating atmosphere, and/or (4) from an external source into the spontaneous system. Moreover, rather than supplying an infiltration enhancer precursor, an infiltration enhancer may be supplied directly to at least one of the filler material or preform, and/or matrix metal, and/or infiltrating atmosphere. Ultimately, at least during the spontaneous infiltration, the infiltration enhancer should be located in at least a portion of the filler material or preform.

Without wishing to be bound by any particular theory or explanation, when an infiltration enhancer precursor is utilized in combination with at least one of the matrix metal, and/or filler material or preform and/or infiltrating atmosphere, the infiltration enhancer precursor may react to form an infiltration enhancer which induces or assists molten matrix metal to spontaneously infiltrate a filler material or preform. Moreover, it appears as though it may be necessary for the precursor to the infiltration enhancer to be capable of being positioned, located or transportable to a location which permits the infiltration enhancer precursor to interact with at least one of the infiltrating atmosphere, and/or the preform or filler material, and/or molten matrix metal. For example, in some matrix metal/infiltration enhancer precursor/infiltrating atmosphere systems, it is desirable for the infiltration enhancer precursor to volatilize at, near, or in some cases, even somewhat above the temperature at which the matrix metal becomes molten. Such volatilization may lead to: (1) a reaction of the infiltration enhancer precursor with the infiltrating atmosphere to form a solid liquid or gaseous infiltration enhancer which enhances wetting of the filler material or preform by the matrix metal; or (2) a reaction of the infiltration enhancer precursor within the filler material or preform which forms a solid. liquid or gaseous infiltration enhancer in at least a portion of the filler material or preform which enhances wetting.

Thus, for example, if an infiltration enhancer precursor were included or combined with molten matrix metal at least at some point during the process, it is possible that the infiltration enhancer precursor could volatilize from the molten matrix metal and react with at least one of the filler material or preform and/or the infiltrating atmosphere. Such reaction could result in the formation of a solid species, if such solid species is stable at the infiltration temperature, said solid species being capable of being deposited on at least a portion of the filler material or preform as, for example, a coating. Moreover, it is conceivable that such solid species could be present as a discernible solid within at least a portion of the preform or filler material. If such a solid species were formed, molten matrix metal may have a tendency to react (e.g., the molten matrix metal may reduce the formed solid species) such that infiltration enhancer precursor may become associated with (e.g., dissolved in or alloyed with) the molten matrix metal. Accordingly, additional infiltration enhancer precursor may then be available to volatilize and react with another species (e.g., the filler material or preform and/or infiltrating atmosphere) and again form a similar solid species. It is conceivable that a continuous process of conversion of infiltration enhancer precursor to infiltration enhancer followed by a reduction reaction of the infiltration enhancer with molten matrix metal to again form additional infiltration enhancer precursor, and so on, could occur, until the result achieved is a spontaneously infiltrated metal matrix composite.

In a preferred embodiment of the invention. it is possible that the infiltration enhancer precursor can be at least partially reacted with the infiltrating atmosphere such that the infiltration enhancer can be formed in at least a portion of the filler material or preform prior to or substantially contiguous with contacting the filler material or preform with the matrix metal (e.g., if magnesium were the infiltration enhancer precursor and nitrogen were the infiltrating atmosphere, the infiltration enhancer could be magnesium nitride which would be located in at least a portion of the preform or filler material).

Under the conditions employed in the method of the present invention, in the case of an aluminum/magnesium/nitrogen spontaneous infiltration system, the preform or filler material should be sufficiently permeable to permit the nitrogen-containing gas to penetrate or permeate the filler material or preform at some point during the process and/or contact the molten matrix metal. Moreover, the permeable filler material or preform can accommodate infiltration of the molten matrix metal, thereby causing the nitrogen-permeated preform to be infiltrated spontaneously with molten matrix metal to form a metal matrix composite body and/or cause to the nitrogen to react with an infiltration enhancer precursor to form infiltration enhancer in the filler material or preform and thereby result in spontaneous infiltration. The extent of spontaneous infiltration and formation of the metal matrix composite will vary with a given set of process conditions, including magnesium content of the aluminum alloy, magnesium content of the preform or filler material, amount of magnesium nitride in the preform or filler material, the presence of additional alloying elements (e.g., silicon, iron. copper, manganese, chromium, zinc, and the like), average size of the filler material (e.g., particle diameter) comprising the preform or the filler material, surface condition and type of filler material or preform, nitrogen concentration of the infiltrating atmosphere, time permitted for infiltration and temperature at which infiltration occurs. For example, for infiltration of the molten aluminum matrix metal to occur spontaneously, the aluminum can be alloyed with at least about 1 percent by weight, and preferably at least about 3 percent by weight, magnesium (which functions as the infiltration enhancer precursor), based on alloy weight. Auxiliary alloying elements, as discussed above, may also be included in the matrix metal to tailor specific properties thereof. Additionally, the auxiliary alloying elements may affect the minimum amount of magnesium required in the aluminum matrix metal to result in spontaneous infiltration of the filler material or preform. Loss of magnesium from the spontaneous system due to, for example, volatilization should not occur to such an extent that no magnesium was present to form infiltration enhancer. Still further, the presence of magnesium in both of the preform (or filler material) and matrix metal may result in a reduction in the total required amount of magnesium to achieve spontaneous infiltration. Additionally. such placement of the magnesium may permit lowering of the temperature at which infiltration occurs, and/or may reduce the amount of undesirable magnesium-containing intermetallics.

It has been noted that it is possible to supply to the spontaneous system infiltration enhancer precursor and/or infiltration enhancer on a surface of the alloy and/or on a surface of the preform or filler material and/or within the preform or filler material and/or from an external source prior to infiltrating the matrix metal into the filler material prior to infiltrating the matrix metal into the filler material or preform. For example, in the aluminum/magnesium/nitrogen system. if the magnesium was applied to a surface of the matrix metal it may be preferred that the surface should be the surface which is closest to, or preferably in contact with, the permeable mass of filler material or vice versa.

The concentration of magnesium in the alloy, and/or placed onto a surface of the alloy, and/or combined in the filler or preform material, also tends to affect the extent of infiltration at a given temperature. The temperature required to effect the spontaneous infiltration process of this invention may be lower: (1) when the magnesium content of the alloy alone is increased; and/or (2) when alloying constituents are mixed with the permeable mass of filler material or preform; and/or (3) when another element such as zinc or iron is present in the aluminum alloy. The temperature also may vary with different filler materials. In general, in the aluminum/magnesium/nitrogen system spontaneous and progressive infiltration will occur at a process temperature of at least about 675° C. and preferably a process temperature of at least about 750° C.–800° C.

In the embodiment in which an infiltration enhancer such as magnesium nitride is produced in situ by chemically reacting a magnesium containing infiltration enhancer precursor with a nitrogen containing infiltrating atmosphere, it is not necessary to maintain the presence of the nitrogen containing atmosphere throughout the entire infiltration process. Specifically, once sufficient infiltration enhancer has been produced, the infiltration of the molten matrix metal into the permeable mass or preform may be conducted under vacuum or under a different infiltrating atmosphere such as an atmosphere which is chemically inert with respect to at least the infiltration enhancer precursor, for example, argon.

The method of forming a metal matrix composite is applicable to a wide variety of filler materials, and the choice of filler materials will depend on such factors as the matrix alloy, the process conditions, the reactivity of the molten matrix alloy with the filler material, and the properties sought for the final composite product. For example, when aluminum is the matrix metal, suitable filler materials include (a) oxides, e.g., alumina, magnesia. zirconia; (b) carbides, e.g., silicon carbide; (c) borides, e.g., aluminum dodecaboride, titanium diboride, and (d) nitrides, e.g., aluminum nitride, and (e) mixtures thereof. Ceramics which are preferred for use in the present method include alumina and silicon carbide.

The size, shape, chemistry and volume percent of the filler material (or preform) can be any that may be required to achieve the properties desired in the composite. Thus, the filler material may be in the form of particles, whiskers, platelets or fibers since infiltration is not restricted by the shape of the filler material. The fibers can be discontinuous (in chopped form) or in the form of continuous filament, such as multifilament tows. Other shapes such as spheres, tubules, pellets, refractory fiber cloth, and the like may be employed. Further, the filler material or preform may be homogeneous or heterogeneous. Average particle diameters as small as a micron or less to about 1100 microns or more can be successfully utilized in the present invention, with a range of about 2 microns through about 1000 microns being preferred for a vast majority of commercial applications.

Further, the constituency of the matrix metal within the metal matrix composite may be modified by controlling the cooling rate of the metal matrix composite. For example, the metal matrix composite may be directionally solidified by any number of techniques including: placing the container holding the metal matrix composite upon a chill plate; and/or selectively placing insulating materials about the container. Such directional solidification can also reduce the size and extent of defects (e.g., porosity). Further, the constituency of the metal matrix may be modified after formation of the metal matrix composite as, for example, by a heat treatment.

Moreover, it is possible to use a reservoir of matrix metal to assure complete infiltration of the filler material and/or to supply a second metal which has a different composition from the first source of matrix metal.

It has been observed that for aluminum infiltration and matrix formation around a ceramic filler, wetting of the ceramic filler by the aluminum matrix metal may be an important part of the infiltration mechanism. Further, the wetting of the filler by molten matrix metal may permit a uniform dispersion of the filler throughout the formed metal matrix composite body and improve the bonding of the filler to the matrix metal. Moreover, at low processing temperatures, a negligible or minimal amount of metal nitriding occurs resulting in a minimal discontinuous phase of aluminum nitride dispersed in the matrix metal. However, as the upper end of the temperature range is approached, nitridation of the metal is more likely to occur. Thus, the amount of the nitride phase in the metal matrix can be controlled by varying the processing temperature at which infiltration occurs.

The specific process temperature at which nitride formation becomes more pronounced also varies with such factors as the matrix aluminum alloy used and its quantity relative to the volume of filler or preform, the filler material to be infiltrated, and the nitrogen concentration of the infiltrating atmosphere. For example, the extent of aluminum nitride formation at a given process temperature is believed to increase as the ability of the matrix metal to wet the filler decreases and as the nitrogen concentration of the atmosphere increases.

By the same token, when infiltration enhancer is formed in situ in the permeable mass of filler material prior to infiltration, the amount of aluminum nitride subsequently formed may depend on the amount of magnesium nitride infiltration enhancer formed. As discussed above, the concentration of infiltration enhancer formed may depend on the amount of magnesium infiltration enhancer precursor which can be reacted with nitrogen infiltrating atmosphere. This quantity, in turn, will depend upon the magnesium vapor pressure (temperature dependent) and the amount of time that magnesium is permitted to react with nitrogen.

In producing metal matrix composite bodies to a desired size and shape, a barrier material typically is applied to the outer surfaces of a preform or a permeable mass to be infiltrated for the purpose of terminating the infiltration process at these outer surfaces. In the absence of such a barrier material layer, it has been observed that the spontaneous infiltration process can extend beyond the original outer surfaces of a permeable mass or preform. Such a phenomenon has been termed "over-infiltration" and was first disclosed in the previously-discussed U.S. Pat. No. 4,828,008 to White et al. as an aluminum nitride skin. It is not completely clear how this over-infiltration process occurs. The over-infiltration manifests itself as a surface layer on the underlying or substrate metal matrix composite body. This surface layer consists of aluminum nitride embedded by interconnected matrix metal. The aluminum nitride may range from substantially discontinuous bodies to a substantially interconnected co-matrix component. Generally speaking, the amount and continuity or connectivity of the aluminum nitride phase increases as the processing temperature increases.

This over-infiltration zone typically is less than about 1 millimeter thick. For many applications a thicker layer would be desirable. Specifically, where the surface layer is to be machined, a thicker layer would provide a greater amount of machining stock.

Figure 1:
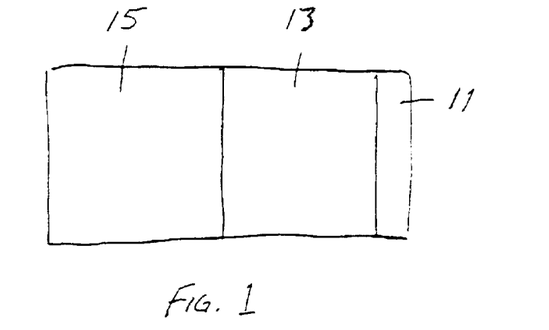
FIGS. 1–3 are cross-sectional schematic views of various embodiments for applying the MMC coating of the present invention.

The present invention provides a technique for producing these thicker MMC surface layers. Specifically, and with reference to FIG. 1, a fugitive material 11 is applied to the permeable mass (or preform) 13 to a desired thickness. In a preferred embodiment the fugitive material comprises a metal in particulate form. In a particularly preferred embodiment the fugitive metal comprises a metal having a melting point higher than the melting point of the infiltrating matrix metal. For example, if the matrix metal comprises aluminum, the fugitive metal could comprise particulate copper. Under spontaneous infiltration conditions (e.g., in the presence of an infiltration enhancer or infiltration atmosphere/infiltration enhancer precursor combination) the molten matrix metal 15 comprising aluminum infiltrates through the particulate copper layer to form a metal matrix composite surface layer comprising aluminum, copper and aluminum nitride. Using such particulate metals as fugitive materials, MMC surface layers up to about 6 millimeters in thickness have been produced. Further, when the fugitive metal comprises a metal having a chemical composition which is different from that of the matrix metal, the possibility of "metal phase tailoring" exists. Such metal phase tailoring affords the opportunity of further modifying or engineering the properties of at least the surface layer through control of the extent of alloying or diffusion of the fugitive metal into the matrix metal, or of the extent of reaction of the fugitive metal with the matrix metal (e.g., to form intermetallics). Commonly owned U.S. Pat. Nos. 5,518,061 and 5,287,911 provide detailed discussion of metal phase tailoring, particularly as applied to metal matrix composites. The entire disclosures of these two commonly owned U.S. patents are incorporated herein by reference.

Figure 2:
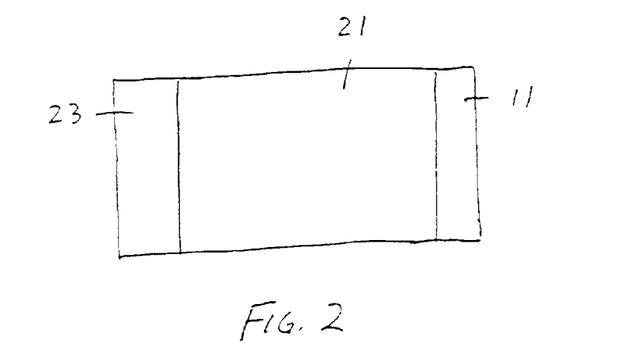
Figure 3:
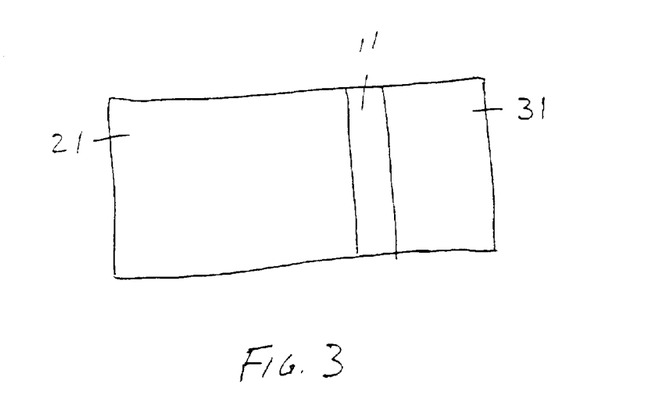

In another embodiment for forming the present MMC surface layers, the fugitive material need not be applied to a permeable mass or preform. Instead, the fugitive material 11 may be applied to a surface of a MMC 21 which has been formed already by spontaneous infiltration (see, for example, FIG. 2). Once spontaneous infiltration conditions have been reestablished, matrix metal (e.g., from within the MMC) may begin to infiltrate the fugitive material layer. It may be desirable to provide a reservoir 23 of additional matrix metal in contact with the MMC to replenish that from the original MMC lost to infiltration of the fugitive material. Alternatively, a separate body 31 of matrix metal may be provided in direct contact with the fugitive material layer, as shown in FIG. 3.

Extending this embodiment further, a fugitive material layer may be applied to a surface of a MMC body not produced by spontaneous infiltration. When spontaneous infiltration conditions are present or created, matrix metal, whether from the original MMC body or from some other source, can infiltrate the fugitive material layer to produce the MMC surface layer. In this embodiment, it may be necessary to supply the source of infiltration enhancer precursor such as magnesium, because such a substance may not have been present to produce the original MMC body. A particularly preferred technique for providing such magnesium is to mix it in particulate form with particulates of the fugitive metal. When there are no ceramic materials present in the fugitive metal layer, the magnesium may not be necessary to achieve infiltration of one molten metal into particulates of another; however, the amount and distribution of aluminum nitride formed in-situ in the surface layer can be controlled better when an infiltration enhancer or infiltration enhancer precursor is present.

In yet another embodiment, the MMC surface layer can be applied to an unreinforced metal body. The matrix metal for the MMC surface layer may be supplied by the unreinforced metal body, or it may be supplied from an additional source contacted to the fugitive material layer. An infiltration enhancer or infiltration enhancer precursor such as magnesium should be present in the system at least at some point to create the spontaneous infiltration conditions necessary to form in-situ aluminum nitride in the MMC surface layer. Spontaneous infiltration conditions are also desirable to achieve infiltration when ceramic materials are present in the fugitive material layer. Absent such conditions, most ceramic materials are difficult to infiltrate without having to resort to pressure or vacuum infiltration assists.

The fact that the metal matrix composite layer is highly engineerable makes the MMC surface layer, and the entire macrocomposite article in fact, highly versatile. Specifically, by tailoring the amount of aluminum nitride present in the coating layer, properties such as hardness and thermal expansion coefficient can be controlled. For example, as the aluminum nitride content decreases, the wear resistance and abrasiveness of the layer decrease, and the machinability and thermal expansion coefficient increase. In turn, the aluminum nitride content can be controlled through processing temperature and infiltration enhancer concentration. Specifically, more aluminum nitride is produced as each of the above-identified parameters is increased. The concentration of infiltration enhancer (e.g., magnesium nitride) on or adjacent to a surface of a preform or MMC body can be controlled by varying (controlling), for example, the concentration of infiltration enhancer precursor (e.g., magnesium) in the coating layer. In this way, coating layers have been produced featuring aluminum nitride concentrations ranging from about 5 volume percent to about 50 percent.

The following Examples further illustrate the present invention.

EXAMPLE 1

This Example demonstrates, among other things, the fabrication of a macrocomposite test sample for machinability evaluations. This example furthermore demonstrates the fabrication of a macrocomposite body featuring a MMC surface layer on the interior wall of a MMC closed-end tube.

A preform and a core to help define the interior surface of the preform each comprised a particulate admixture and each were consolidated and rendered self-supporting by compression molding.

A particulate admixture suitable for compression molding was prepared as follows. The particulate admixture for forming the preform consisted of 38 Alundum™ alumina particulate (Norton-St. Gobain, Worcester, Mass.) having an average particle size of about 25 microns, to which had been added about 2 weight percent of magnesium particulate having substantially all particles smaller than about 45 microns in diameter, plus about 1.5 weight percent of a binder based on polyureasilazane. The binder consisted of CERASET™ polyureasilazane inorganic polymer (Lanxide Corporation. Newark, Del.) to which had been added about 1% by weight of Lupersol™ 231 peroxide (Aldrich Chemical Co., Milwaukee, Wis.).

The particulate admixture for forming the core piece consisted of equal weight fractions of grade KS75 graphite particulate (Lonza Inc., Fairlawn, N.J.) and 39 Crystolon™ silicon carbide particulate (Norton-St. Gobain, Worcester, Mass.) having an average particle size of about 17 microns. To this admixture was added about 20% by weight of grade F69 glass frit (Fusion Ceramics, Carrollton, Ohio.), and about 10% by weight of the above-identified polyureasilazane based binder.

The mixing was accomplished as follows: The solid particulates for each admixture were hand mixed in a metal can, then transferred to the bowl or mixing chamber of a Model RV02 Eirich® high intensity mixer (Eirich Machines. Inc., Uniontown Pa.). The binder solution components were stirred together, then about half of the solution was added to the mixing chamber bowl. After mixing on the fast speed setting for a few minutes, the rest of the binder solution was added. After additional mixing, each admixture was screened through a 25 mesh screen and stored in a sealed container.

A short, closed-end tube preform (e.g., cup shaped) and a cylindrical core piece were each formed by compression molding the respective particulate admixtures at a temperature of about 170° C. applying a pressure of about 420 psi (2900 kPa) and maintaining this temperature and pressure for about 20 minutes. The core piece was coated with Dylon colloidal graphite (Dylon™ Industries, Cleveland, Ohio.) on all external surfaces.

The cup-shaped preform and the core were then bisque fired as follows: The pieces were placed flush on a setter tray made from refractory material. The setter tray and its to contents was then placed into an air atmosphere furnace at about 20° C. The furnace temperature was then raised at a rate of about 100° C. per hour to a temperature of about 300° C. After maintaining a temperature of about 300° C. for about 2 hours, the furnace temperature was increased to a temperature of about 425° C. at about 100° C. per hour. After maintaining a temperature of about 425° C. for about 4 hours, the furnace temperature was decreased to about 20° C. at a rate of about 200° C. per hour. The preform and core were then removed to a drying oven maintained at about 50° C. until further processing.

Figure 4:
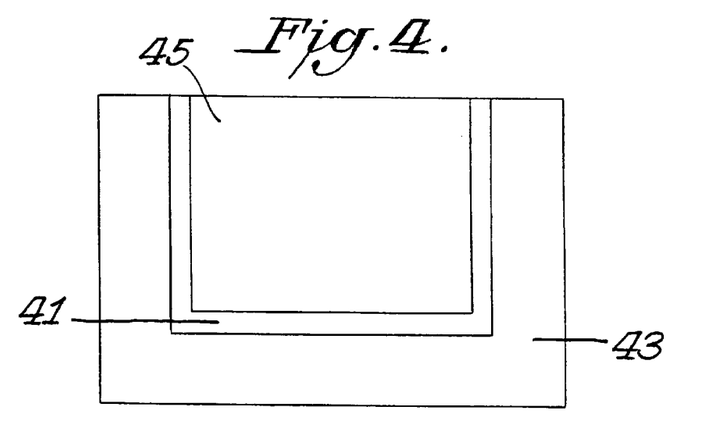
FIG. 4 is a close-up, cross-sectional view of the preform and fugitive material discussed in Example 1.

The diameter of the core was about 0.25 inch (6 mm) smaller than the inside diameter of the cup-shaped preform. Referring to FIG. 4, an admixture 41 consisting of equal weight fractions of copper and magnesium particulates was poured into the cavity in the cup-shaped preform 43 to a depth of about 3 mm. The core piece 45 was centered in the cavity in the cup preform, and the annulus space between the core and the cup was filled with additional particulate admixture. Substantially all of the copper particulates were smaller than about 45 microns in diameter, whereas the size of the magnesium particulates ranged between about 75 microns and about 150 microns in diameter.

Figure 5:
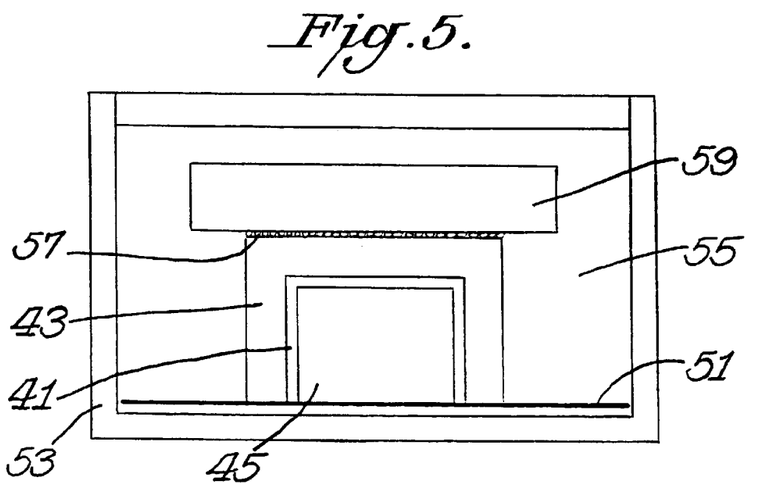
FIG. 5 is a cross-sectional schematic view of the setup used to produce the machining test cup of Example 1.

A setup for infiltration of molten matrix metal was then prepared. Referring now to FIG. 5, a graphite foil sheet 51 was placed over the core piece, fugitive material and cup shaped preform to form a unit. The unit was then inverted and placed on the floor of a graphite boat 53. A particulate admixture 55 comprising by weight about 10% grade F69 glass frit (Fusion Ceramics. Inc., Carrollton, Ohio.) and the balance 90 grit (216 microns) 38 Alundum® aluminum oxide particulate (Norton-St. Gobain, Worcester, Mass.) was then poured into the graphite boat around the unit until flush with the top surface of the preform 43. Next, about 100 grams of a particulate admixture 57 comprising by weight about 5% magnesium particulate (−100+200 mesh, Hart Metals, Tamaqua, Pa.) and the balance 90 grit (216 microns) 38 Alundum® aluminum oxide particulate (Norton-St. Gobain) was sprinkled evenly over the surface of preform 43. A body of matrix metal 59 having a mass of about 1 kg and comprising by weight 7% magnesium and the balance aluminum was centered on top of the admixture layer 57.

Sufficient additional particulate admixture 55 was then poured into the graphite boat, burying the body of matrix metal 59 to a depth of about 0.5 inch (13 mm) to complete the setup.

The setup comprising the graphite boat and its contents was thermally processed to promote spontaneous infiltration. Specifically, the completed setup was then placed into a controlled atmosphere furnace at substantially ambient (e.g., about 20° C.) temperature. After evacuating the furnace chamber with a mechanical roughing pump and backfilling with commercially pure nitrogen gas, a nitrogen gas flow rate of about 15 standard liters per minute was established and maintained.

The temperature of the furnace and its contents was then increased to a temperature of about 250° C. at a rate of about 200° C. per hour. After maintaining a temperature of about 250° C. for up to about 30 hours, the temperature was increased to about 480° C., again, at a rate of about 200° C. per hour. After maintaining a temperature of about 480° C. for about 5 hours, the temperature was increased to about 580° C. After maintaining a temperature of about 580° C. for about 5 hours, the temperature was further increased to about 800° C. at a rate of about 100° C. per hour. After maintaining a temperature of about 800° C. for about 4 hours, the temperature was decreased to about 700° C. at a rate of about 200° C. per hour. The assembly was removed from the furnace at a temperature of about 700° C. and placed on a graphite slab to continue cooling in air to ambient temperature at its natural cooling rate.

The molten matrix metal had substantially completely infiltrated the cup-shaped preform, as well as the particulate metal layer, but had terminated at the core piece. Upon cooling, the core piece was removed by sandblasting. What remained was a macrocomposite cup featuring one metal matrix composite material forming the exterior of the cup and a second metal matrix composite material making up the interior.

EXAMPLE 2

This Example demonstrates, among other things, an improved technique for infiltrating a preform with a molten matrix metal to form a metal matrix composite article. Specifically, the present Example demonstrates the formation of a surface layer of desired thickness on the metal matrix composite article having a reduced hardness with respect to the underlying MMC material.

Figure 6:
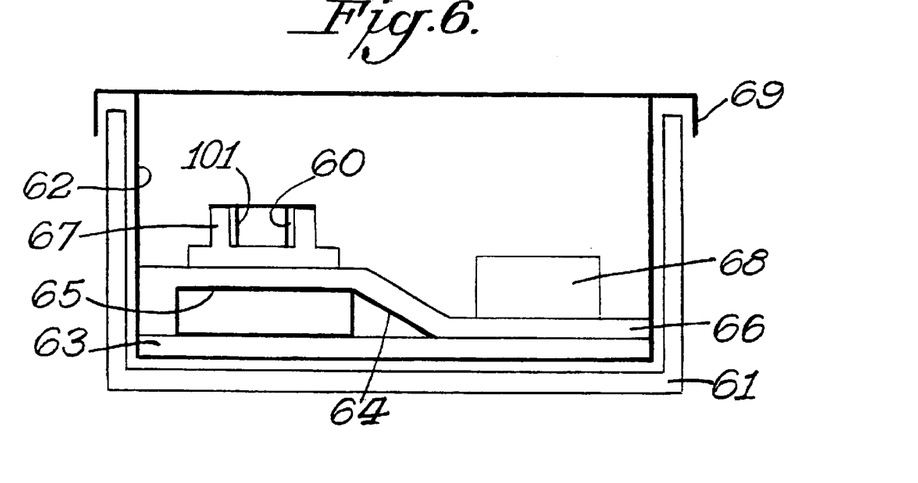
FIG. 6 is a cross-sectional schematic view of the setup used to produce the disc-shaped article of Example 2.

A disc-shaped preform 67 having a cross-section substantially as shown in FIG. 6 was produced by compression molding. The preform composition and the pressing procedures were substantially the same as those for the preform detailed in Example 1. A particulate admixture 60 comprising copper and magnesium substantially as described in Example 1 was applied to one of the surfaces of the preform and held in place with graphite foil ring 101, as shown in the Figure.

With further reference to FIG. 6, a graphite boat 61 measuring about 13 inches (330 mm) long by about 9 inches (229 mm) wide by about 3.5 inches (89 mm) in height was lined on its interior surfaces with a single sheet of GRAFOIL® graphite foil material 62 (Union Carbide Co., Danbury, Conn.). A particulate admixture 63 comprising by weight about 5 percent Grade F69 glass frit (Fusion Ceramics, Inc., Carrollton, Ohio.) and the balance 90 grit (216 microns ave, particle size) 38 Alundum® alumina particulate (Norton-St. Gobain, Worcester, Mass.) was poured onto the floor of the graphite foil lined boat 61 to a uniform depth of about 0.5 inch (13 mm). A GRAFOIL® graphite foil ramp 64 and platform 65 were fabricated by cutting and folding another single sheet of graphite foil and positioned near one of the interior walls of the graphite foil lined boat. The graphite foil platform measured about 5 inches (127 mm) square by about 0.75 inch (19 mm) in height. A second particulate admixture 66 comprising by weight about 3 percent magnesium particulate (Hart Metals. Tamaqua, Pa.) having substantially all particles between about 150 microns and about 300 microns in size and the balance 90 grit (216 microns) 38 Alundum® alumina was uniformly distributed over the first particulate admixture 63 and over the graphite foil platform 65 and ramp 64 to a thickness of about 0.25 inch (6 mm). The preform to be infiltrated was then placed on top of this second particulate admixture above the graphite foil platform 65 and an ingot of matrix metal 68 was placed on the second particulate admixture 66 near the wall of the graphite boat opposite that adjacent to the preform. The ingot of matrix metal comprised by weight about 5 percent magnesium, balance aluminum and had a mass of about 460 grams. The opening of the graphite foil lined boat was loosely covered with another sheet of graphite foil 69 to complete the setup.

The setup was then placed into a controlled atmosphere furnace at substantially ambient (e.g., about 20° C.) temperature. The furnace atmosphere was first evacuated. then backfilled with commercially pure nitrogen. A continuous flow of nitrogen was established. The furnace and its contents were then heated to a temperature of about 250° C. at a rate of about 200° C. per hour. After maintaining a temperature of about 250° C. for up to about 30 hours, the temperature was increased to about 480° C., again, at a rate of about 200° C. per hour. After maintaining a temperature of about 480° C. for about 5 hours, the temperature was increased to about 580° C. After maintaining a temperature of about 580° C. for about 5 hours, the temperature was further increased to about 800° C. at a rate of about 100° C. per hour. After maintaining a temperature of about 800° C. for about 4 hours, the temperature was decreased to about 700° C. at a rate of about 200° C. per hour. The setup was removed from the furnace at a temperature of about 700° C. and placed on a graphite slab to continue cooling in air to ambient temperature at the setup's natural cooling rate. Disassembly of the graphite boat and its contents revealed that the disc shaped preform had been fully infiltrated (including the applied coating) to produce a metal matrix composite body.

The infiltrated surface layer was characterized by image analysis and Knoop microhardness. Analysis of 96 frames at a magnification of about 200X yielded the following results—ceramic: 34 volume percent; metal: 60 percent; other: 6 percent. Five Knoop hardness indentations on the MMC surface layer produced the following hardness numbers: maximum 347; minimum 252; average 288. By comparison the average Knoop hardness of the MMC substrate is in the vicinity of 1000.

Thus, the present Example demonstrates that a metal matrix composite body can be formed having an engineered surface. Specifically, the present Example demonstrates that a MMC surface layer can be formed on a MMC substrate body by infiltrating a fugitive metal layer under spontaneous infiltration conditions. Further, an aluminum nitride reinforcement of the MMC surface layer is formed in-situ. Also, the MMC surface layer can be engineered to have a lower hardness than that of the MMC substrate.

The preceding Examples are by no means exhaustive, instead they are illustrative of the present invention. An artisan of ordinary skill will readily appreciate that numerous minor modifications of the above-identified Examples can be made without departing from the scope and spirit of the present invention, as set forth in the following claims.

What is claimed is:

1. A method for producing a metal matrix composite body, comprising:

providing a slightly undersized preform comprising at least one filler material;

spontaneously infiltrating said preform with a molten matrix metal comprising aluminum in the presence of an infiltrating atmosphere comprising nitrogen to form a slightly undersized metal matrix composite substrate;

maintaining said metal matrix composite substrate at a temperature in said infiltrating atmosphere for a time sufficient to cause said molten matrix metal to overinfiltrate said preform and thereby develop a coating comprising aluminum nitride embedded in a metal comprising aluminum, said coating being developed on at least a portion of at least one surface of said metal matrix composite substrate, said coating also being 1 mm or more in thickness; and removing via machining some of said coating material to provide the desired size and surface finish of said metal matrix composite body.

2. A method for producing a macrocomposite body, comprising:

providing a permeable mass or preform comprising at least one filler material, coating at least a portion of said permeable mass or preform with a permeable layer comprising at least one fugitive metal; contacting at least a portion of said coated permeable mass or preform to a molten matrix metal;

causing said molten matrix metal to infiltrate said permeable mass or preform and said permeable layer comprising at least one fugitive metal so that said molten matrix metal is in contact with said at least one fugitive metal in said permeable layer;

maintaining said contact between said molten matrix metal and said at least one fugitive metal for a time sufficient to cause at least a portion of said at least one fugitive metal to react with or dissolve into said molten matrix metal to form a metal mixture or alloy having a composition that is different from said matrix metal; and cooling said molten matrix metal to form a macrocomposite body comprising a metal matrix composite substrate and a metal matrix composite coating on at least a portion of said substrate, wherein the composition of the metal matrix of said coating is different from the composition of the metal matrix of said substrate.

3. A macrocomposite body comprising:

a metal matrix composite substrate comprising a first matrix metal embedding at least one filler material; and a metal matrix composite coating metallurgically bonded to said substrate, wherein said metal matrix composite coating comprises aluminum nitride contained in a second matrix metal that has a composition that is different from said first matrix metal, and further wherein said coating is more machinable than said substrate and is 1 mm or more in thickness.

4. The method of claim 2, wherein said metal matrix composite coating is more machinable than said substrate.

5. The macrocomposite body of claim 3, wherein said metal matrix composite coating comprises a matrix comprising aluminum.

6. The macrocomposite body of claim 3, wherein said metal matrix composite coating comprises copper.

7. The macrocomposite body of claim 3, wherein said metal matrix composite coating is at least 2 mm in thickness.

8. The macrocomposite body of claim 3, wherein said metal matrix composite coating comprises at least one ceramic reinforcement material selected from the group consisting of oxides and carbides.

9. A method for producing a macrocomposite body, comprising:

providing a metal matrix composite body substrate comprising at least one reinforcement material and a matrix metal;

contacting at least a portion of at least one surface of said metal matrix composite body with a permeable mass comprising at least one fugitive metal;

contacting a molten metal to said permeable mass;

infiltrating said permeable mass with said molten metal so that said molten metal is in contact with said at least one fugitive metal in said permeable mass;

maintaining said contact between said molten metal and said at least one fugitive metal for a time sufficient to cause at least a portion of said at least one fugitive metal to react with or dissolve into said molten metal to form a metal mixture or alloy having a composition that is different from said matrix metal of said substrate; and cooling said molten metal to form a macrocomposite body comprising a metal matrix composite substrate and a coating comprising said metal mixture or alloy on at least a portion of said substrate.

10. The method of claim 9, wherein said molten metal is said matrix metal.

11. The method of claim 9, wherein said molten metal is provided from a source external to said metal matrix composite body.

12. The method of claim 9, wherein said molten metal is caused to infiltrate said permeable mass spontaneously.

13. The method of claim 9, further comprising providing an infiltration enhancer precursor and an infiltrating atmosphere in communication with said permeable mass and said molten metal.

14. The method of claim 9, further comprising providing a reservoir source of said matrix metal in contact with said metal matrix composite body during said infiltration of said permeable mass.

15. A method for producing a macrocomposite body comprising:

providing a metal matrix composite substrate body comprising at least one filler material distributed through a matrix metal;

coating at least a portion of said metal matrix composite substrate body with a permeable layer comprising at least one filler material and at least one fugitive material;

contacting at least a portion of said coated metal matrix composite substrate body to a molten metal;

causing said molten metal to infiltrate said permeable layer and contact said at least one fugitive material;

maintaining said contact between said molten metal and said at least one fugitive material for a time sufficient to cause at least a portion of said at least one fugitive material to react with or dissolve into said molten metal; and cooling said molten metal to form a macrocomposite body comprising said metal matrix composite substrate body and a metal matrix composite coating on at least a portion of said substrate body, said coating having a volumetric loading of said at least one filler material that is reduced in comparison to the volumetric loading that would have been obtained if the at least one fugitive material had not been present.

16. The macrocomposite body of claim 3, wherein said aluminum nitride that is contained in said metal matrix composite coating is dispersed in the metal matrix formed by the second matrix metal.

17. The macrocomposite body of claim 3, wherein said coating has a lower average Knoop hardness than said substrate.

18. The macrocomposite body of claim 1, wherein said coating has a thickness of from 1 to 6 mm.

19. The macrocomposite body of claim 3, wherein said coating has a thickness of from 1 to 6 mm.

20. The method of claim 2, wherein said coating has a thickness of from 1 to 6 mm.

* * * * *